US012220357B2

(12) United States Patent
Daske et al.

(10) Patent No.: US 12,220,357 B2
(45) Date of Patent: Feb. 11, 2025

(54) SUPPLY SYSTEM WITH A MAIN BODY WHICH HAS AN UNDERCUT

(71) Applicant: Drägerwerk AG & Co. KGaA, Lübeck (DE)

(72) Inventors: Jochen Daske, Lübeck (DE); Maja Finke, Lübeck (DE); Andreas Nandzik, Lübeck (DE); Uwe Holst, Lübeck (DE); Thomas Martin, Lübeck (DE); Maximilian Behler, Lübeck (DE)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 277 days.

(21) Appl. No.: 17/636,563

(22) PCT Filed: Jul. 14, 2020

(86) PCT No.: PCT/EP2020/069823

§ 371 (c)(1),
(2) Date: Feb. 18, 2022

(87) PCT Pub. No.: WO2021/032363

PCT Pub. Date: Feb. 25, 2021

(65) Prior Publication Data

US 2022/0296448 A1 Sep. 22, 2022

(30) Foreign Application Priority Data

Aug. 22, 2019 (DE) ..................... 10 2019 005 875.5

(51) Int. Cl.
*A61G 12/00* (2006.01)

(52) U.S. Cl.
CPC .................................. *A61G 12/002* (2013.01)

(58) Field of Classification Search
CPC .. A61G 12/002; A61G 12/004; A61G 12/005; A61G 12/007; A61G 12/008
See application file for complete search history.

(56) References Cited

U.S. PATENT DOCUMENTS 5,490,652 A 2/1996 Martin
5,644,876 A * 7/1997 Corbin .................. B01J 20/186 44/628

(Continued)

FOREIGN PATENT DOCUMENTS

CN 201542873 U 8/2010
CN 204364307 U 6/2015

(Continued)

OTHER PUBLICATIONS

"Dräger Linea® Medizinische Versorgungseinheiten" https://www.draeger.com/Products/Content/linea-pi-9051442-de-de.pdf, accessed on Jun. 18, 2020. Dräger: Linea Medizinische Versorgungseinheiten Gebrauchsanweisung. URL: https://www.draeger.com/Products/Content/linea-pi-9051442- de-de.pdf [abgerufen am Jun. 18, 2020] (Zeitnachweis belegt durch pfd.

(Continued)

*Primary Examiner* — Chi Q Nguyen
(74) *Attorney, Agent, or Firm* — McGlew and Tuttle, P.C.

(57) ABSTRACT

A supply system (1*a*) includes a basic body (2) and at least one supply port (3 through 8), which is flush-mounted in the basic body (2) and provides a supply medium. The basic body (2) extends along a longitudinal axis and includes a plurality of outer wall sections (9 through 12) and at least one connection section (13 through 16). The connection section or each connection section (13 through 16) mechanically connects to one another two outer wall sections (9 through 12), which are adjacent to one another. At least one connection section (13 through 16) has at least one undercut (17 through 24). The undercut or each undercut (17 through 24) has the form of a channel or flute or groove or sectional rail and extends along the longitudinal axis of the basic body (2).

12 Claims, 6 Drawing Sheets

(56) References Cited

U.S. PATENT DOCUMENTS

| | | | | |
|---|---|---|---|---|
| 6,196,649 | B1 * | 3/2001 | Block | A61G 12/004 312/205 |
| 6,668,493 | B1 | 12/2003 | Walker | |
| 6,903,265 | B1 * | 6/2005 | VanderVelde | H02G 3/0418 174/68.3 |
| 9,561,324 | B2 * | 2/2017 | Estes | A61M 5/14566 |
| 9,931,261 | B2 * | 4/2018 | Huang | A61B 90/00 |
| 11,167,081 | B2 * | 11/2021 | Adams | A61M 5/168 |
| 11,801,342 | B2 * | 10/2023 | Lacy | A61M 5/172 |
| 2003/0161744 | A1 * | 8/2003 | Vilks | A61M 5/14244 417/415 |
| 2007/0022668 | A1 * | 2/2007 | Kasten | A61G 13/107 52/3 |
| 2007/0218769 | A1 * | 9/2007 | Mummert | A61B 50/13 439/630 |
| 2010/0243823 | A1 * | 9/2010 | Hardy | A61B 90/57 248/65 |
| 2015/0191294 | A1 * | 7/2015 | Paz | B65D 83/0409 221/9 |
| 2018/0206936 | A1 | 7/2018 | Oginski et al. | |
| 2020/0179592 | A1 * | 6/2020 | Adams | A61M 39/284 |

FOREIGN PATENT DOCUMENTS

| | | | |
|---|---|---|---|
| CN | 106794103 | A | 5/2017 |
| CN | 206315232 | U | 7/2017 |
| DE | 3523948 | A1 | 1/1987 |
| DE | 4035830 | C1 | 2/1992 |
| DE | 4306803 | A1 | 9/1994 |
| EP | 3138527 | A1 | 3/2017 |

OTHER PUBLICATIONS

Dräger Medical GmbH: Versorgungsturm Gebrauchsanweisung. 2010. S. 1-16.—Originalschrift der NPL ist (aus urheberrechtlichen Gründen) in der NPLDatenbasis unter der ID 137251 abgelegt; Ersatzdokument in der Akte.—Firmenschrift.

* cited by examiner

SUPPLY SYSTEM WITH A MAIN BODY WHICH HAS AN UNDERCUT

CROSS REFERENCE TO RELATED APPLICATIONS

This application is a United States National Phase Application of International Application PCT/EP2020/069823, filed Jul. 14, 2020, and claims the benefit of priority under 35 U.S.C. § 119 of German Application 10 2019 005 875.5, filed Aug. 22, 2019, the entire contents of which are incorporated herein by reference.

TECHNICAL FIELD

The present invention pertains to a supply system, which comprises a basic body and at least one supply port. The supply port or each supply port is flush-mounted in the basic body and provides a respective supply medium, for example, for a fluid or for an electrical current or a data connection.

TECHNICAL BACKGROUND

Such a supply system is used, for example, in a hospital to supply a medical device with different supply media. A corresponding port of the medical device can be detachably connected to a respective supply port at the basic body.

The supply system is usually mounted in a stationary manner, for example, at a ceiling of a hospital room. It is frequently desired to fasten at least one component detachably at the basic body of the supply system. After the detachable fastenings, the basic body carries the component.

Drager offers medical supply units under the name "Drager Linea" with rails, in which components can be detachably fastened. A description is available at https://www.draeger.com/Products/Content/linea-pi-9051442-de-de.pdf, accessed on Jul. 8, 2020.

SUMMARY

A basic object of the present invention is to provide a supply system with a basic body and with supply ports at the basic body, wherein at least one component can be detachably fastened to the basic body and wherein the supply system puts fewer restrictions on the possible positioning of the component at the basic body than prior-art supply systems.

The supply system according to the present invention comprises a basic body.

This basic body extends along a longitudinal axis.

Furthermore, the supply system according to the present invention comprises at least one supply port, preferably a plurality of supply ports. The supply port or each supply port is flush-mounted in the basic body and is capable of providing a respective supply medium. A corresponding connection element of a device to be supplied can be detachably connected to the supply port.

The basic body comprises a plurality of outer wall sections and at least one connection section. The connection section or each connection section mechanically connects to one another two respective outer wall sections, which are adjacent to one another.

At least one connection section has at least one undercut. The undercut or each undercut has the form of a channel or a flute or a groove or a sectional rail and extends parallel to the longitudinal axis of the basic body.

The undercut or each undercut of the basic body increases the mechanical stability of the basic body compared with an embodiment without undercut. Thanks to the connection section with the undercut, it is avoided that two outer wall sections collide in a straight edge. Such a straight edge may lead to a tear in the basic body.

As already mentioned, it is frequently desired to connect, for example, to mount, a component detachably to the basic body. The component can be provided with at least one engaging element (meshing element), preferably with a plurality of engaging elements arranged at a spaced location from one another. The present invention makes it possible for the engaging element or each engaging element to engage into a respective undercut or with a respective undercut of the basic body. The engaging element of the component and the undercut of the basic body together contribute to holding the component detachably at the basic body. By way of interacting, they prevent that the component can be moved in relation to the basic body in a direction at right angles or obliquely to the longitudinal axis of the basic body.

The basic body is arranged during the use in some embodiments such that the longitudinal axis is arranged vertically or obliquely. The force of gravity then frequently brings about the engaging element or each engaging element getting canted or tilted in the respective undercut and thus the component is held at a certain height at the basic body, without a special fastening element being necessary. Moreover, this embodiment makes it easier in many cases to move the component parallel to the longitudinal axis of the basic body, namely by the canting or tilting in being eliminated, the component is raised, the component is moved into the desired new position and subsequently the force of gravity cants or tilts the component in again.

The component can be relatively easily removed from the basic body again by the component being raised and the engaging component or each engaging component being removed from the respective undercut again.

A component can be connected to the basic body at such a position, at which the basic body has an undercut. The component can preferably be detachably fastened at the basic body between two adjacent undercuts of the basic body. Thanks to the undercuts, a greater part of the basic body is available to receive and to carry a component, even if at least one supply port is "occupied," namely by a plug or other connection element of a device to be supplied. A special fastening element is not necessary. One reason is: As a rule, each supply port is fastened at an outer wall section, while each undercut belongs to a connection section and is arranged at a spaced location from each supply port.

The undercut or each undercut can be provided with a planar surface without projections or sharp edges. Hence, the outer surface of the basic body can be cleaned and disinfected more easily than if a projection, to which a component can be fastened, or if a sharp edge were present. Moreover, such a projection or edge carries the risk that someone is injured or an object is damaged. However, the present invention can also be configured in connection with such a projection.

The undercuts according to the present invention spare the need to have to fasten at least one rail to the basic body in order to configure the basic body such that it can hold a component. A basic body with at least one separate rail is capable of carrying only one component with a lower weight than the basic body according to the present invention with the undercuts. Thanks to the present invention, the weight of a carried component is diverted directly into the basic body and not first into the rail and via a fastening element or fastening section for the rail on the basic body. The risk of mechanical damage is reduced due to the undercuts according to the present invention, compared with rails. Moreover, in some applications, the dimensions of the supply system at right angles to the longitudinal axis of the basic body can be reduced compared with a basic body with rails.

The undercut or each undercut is preferably rounded and preferably extends over the entire length of the basic body, but at least along half the length, so that a component can be detachably fastened to the basic body in many possible positions.

The supply port or each supply port is preferably flush-mounted in a respective outer wall section. The connection section or each connection section is free from supply ports. As a result, it is made possible that all supply ports are available for discharging a respective supply medium, even if at least one component is mounted at the basic body and engages with an undercut.

At least one connection section preferably has two undercuts. The two undercuts of this connection section have each the form of a channel or flute or groove or sectional rail and both extend parallel to the longitudinal axis of the basic body. A distance is present between the two parallel undercuts. This embodiment makes it possible in many cases that a component can be detachably fastened to these two undercuts and then extends around the connection section.

The component is fastened to a corner of the basic body. The rest of the basic body remains free, for example, for supply lines to a device and/or in order to detachably fasten at least one additional component at the basic body. It is also possible for a component to engage with the two undercuts of the connection section and with a third undercut, the third undercut belonging to a different connection section. The component is then held at at least three points and can then have a greater weight.

In a variant of this embodiment, the connection section with the two undercuts has the shape of a mushroom or a T or C or of a segment of a circle or of an ellipse. In one observation direction, this shape is parallel to the longitudinal axis of the basic body, i.e., in a cross-sectional plane, which is at right angles to this longitudinal axis. The mushroom may have an outwardly arched shape. This embodiment takes up relatively little space compared with other possible embodiments and makes it easier to provide a smooth surface. In case of a mushroom-shaped cross section, the C is preferably arched outwards, i.e., away from the two outer wall sections, which are connected to one another by the connection section. A respective undercut is present between the C or segment and the adjacent outer wall section.

The undercut or each undercut is preferably bent and has a curvature, i.e., a smallest radius, of at least 5 mm, especially preferably of at least 10 mm or even at least 15 mm. In this embodiment, the undercut can be manually cleaned in a simpler manner than an undercut with a greater curvature. It is possible to guide a cleaning cloth along the undercut. The curvature may point towards the basic body or away from the basic body.

In a variant of the embodiment with two undercuts, the connection section with the two undercuts is mirror symmetrical, namely in relation to a symmetry plane that extends parallel to the longitudinal axis of the basic body. The two undercuts of this connection section are also mirror symmetrical in relation to this symmetry plane.

The connection section with two undercuts connects two adjacent outer wall sections to each other. An angle, which is, for example, 60° or 90°, is present between these two outer wall sections. This angle is present between the two planes, into which the two respective connected outer wall sections extend. This symmetry plane cuts in half this angle between the two adjacent outer wall sections.

A mirror-symmetrical connection section can in many applications be more easily produced than a connection section having a different shape. Moreover, it is easier to assemble the basic body from the outer wall sections and connection sections, because different correct positions of a mirror-symmetrical connection section are possible, which is often not the case in a connection section that is asymmetrical. Moreover, a mirror-symmetrical connection section is more mechanically stable in many cases than a connection section having a different configuration.

In one embodiment, each outer wall section extends in a plane. An angle is present between the two adjacent planar outer wall sections. This angle is, for example, 45° or 60° or 90° or 120°.

The basic body preferably has at least one reinforcing structure. This reinforcing structure increases the wall thickness of an outer wall section in an area, which adjoins a connection section, compared with an area of the outer wall section that is arranged at a farther spaced location from a connection section. This adjacent connection section has the undercut or at least one undercut.

The reinforcing structure or each reinforcing structure increases the mechanical stability, especially the stiffness and the buckling strength of the basic body, in the connection section and the adjoining areas of the adjacent outer wall sections. This increased mechanical stability is especially important and is desired when a component is connected to the basic body and engages with an undercut of this connection section. This component exerts a leverage on a lever arm, wherein this lever arm is at right angles to the longitudinal axis of the basic body. The connection section transfers this force to the adjoining outer wall sections. The reinforcing structure reduces the risk of mechanical damage.

The reinforcing structure or each reinforcing structure preferably points towards an interior, which is enclosed by the basic body. As a result, the basic body has a smooth outer surface.

In one embodiment, the basic body has a plurality of connection sections with at least one undercut each. The basic body preferably has a respective reinforcing structure for each such connection section. The reinforcing structure for a connection section increases the wall thickness of the two outer wall sections adjoining the connection section in an area, which adjoins a connection section. This embodiment further increases the mechanical stability of the basic body.

The basic body preferably has in a cross-sectional plane, which is at right angles to the longitudinal axis of the basic body, the shape of a polygon, wherein $n>=3$. Preferably, two outer wall sections adjoin each other in each corner of this polygon and are mechanically connected to one another by a connection section, so that the basic body has a total of n connection sections.

Each of these n connection sections preferably has each at least one undercut, especially preferably two undercuts each, so that the basic body has a total of at least n undercuts, preferably even 2*n undercuts. Thanks to this embodiment, a component can be detachably fastened to the basic body from each side of the basic body. Thanks to this embodiment, the supply system according to the present invention can be used and be equipped with components in an especially flexible manner.

In one embodiment, at least one respective supply port is flush-mounted in each outer wall section. In an alternative embodiment, all supply ports are flush-mounted in the same outer wall section. In a third embodiment, a plurality of outer wall sections have at least one respective supply port, while at least one other outer wall section is embodied without a supply port.

Each connection section with the two adjoining outer wall sections is preferably permanently mechanically connected to one another, i.e., a connection section cannot be detached again from an adjoining outer wall section during a regular operation. This embodiment increases the mechanical stability of the basic body.

The supply system is preferably arranged such that the longitudinal axis of the basic body and thus also the undercut or each undercut are arranged vertically. The basic body therefore occupies a relatively small base. As a result, gravity acts parallel to the undercuts.

The present invention pertains, furthermore, to an arrangement with a supply system according to the present invention and with at least one component. The component or a component is fastened detachably or can be fastened detachably to the basic body of the supply system. At least one engaging element of the component engages with an undercut of the basic body.

In one embodiment, the engaging element of the component and the undercut, with which this engaging component engages, together provide a detachable connection for the component, and especially preferably a snap-in connection or a clamped connection or a connection based on wedging in.

It is possible that a holding element is mounted, preferably permanently mounted, at the basic body. At least one undercut as well as this holding element together hold the component. Thanks to the undercuts, it is sufficient that the holding element holds the component at a single point, because each undercut provides an additional holding point.

In one embodiment, the component covers the distance between two adjacent connection sections. These two adjacent connection sections comprise each an undercut, and the two undercuts face one another. Two engaging elements of the component, for example, two inner clamps or inner brackets, point away from one another and engage with these two undercuts facing one another.

In another embodiment, the component extends around a connection section with two undercuts. These two undercuts point away from each other. Two engaging elements of the component, e.g., two outer clamps or outer brackets, point away from one another and engage with the two undercuts of the connection section.

These two embodiments of the component can be combined with one another.

According to the present invention, the supply port or each supply port in the basic body is capable of providing a respective supply medium. This supply medium is, for example, a fluid or electrical current or a data connection. The fluid may be in the gas or liquid or viscous form.

The supply system according to the present invention can especially be used to supply a medical device with at least one supply medium.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
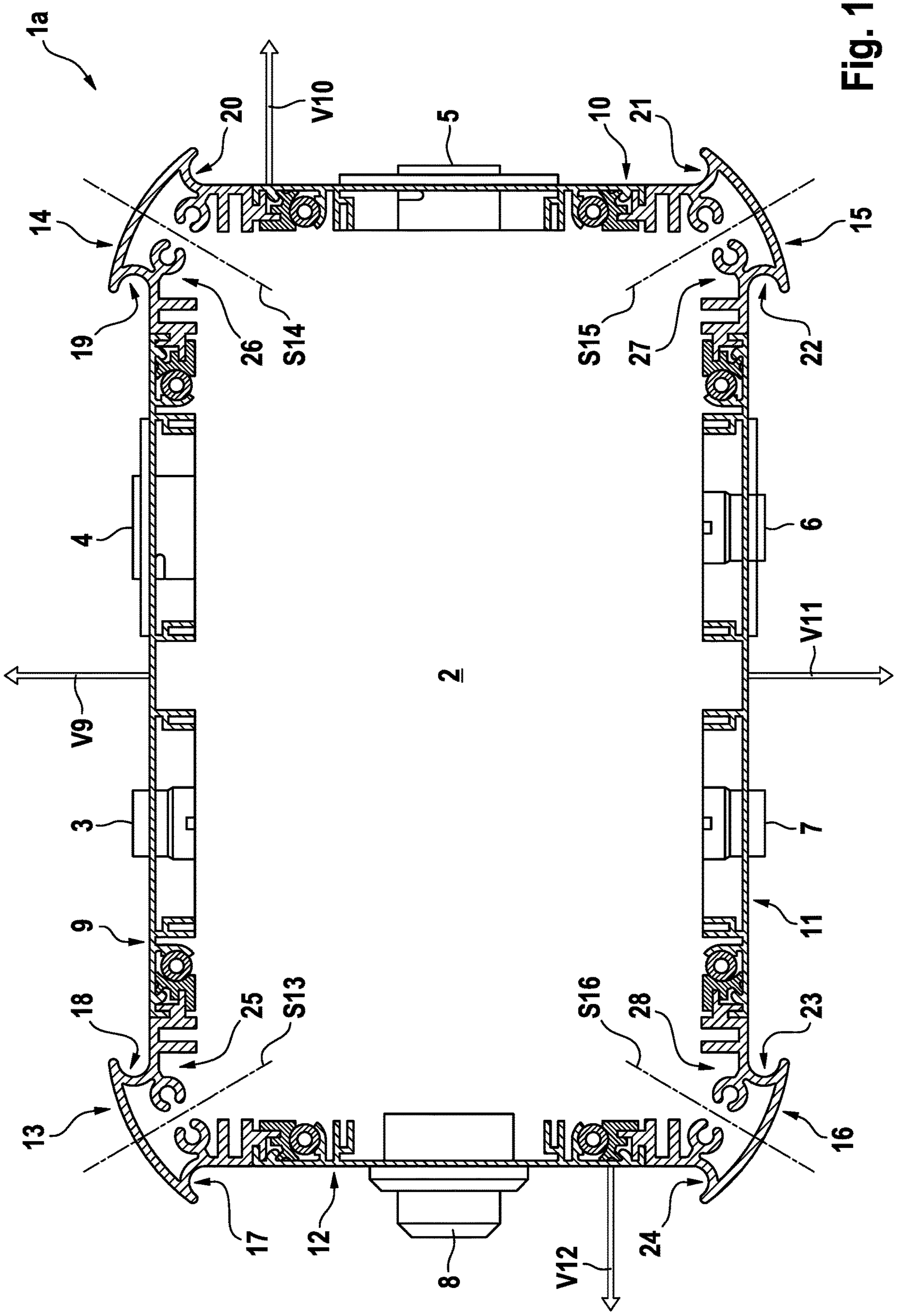
FIG. 1 is a sectional view showing a first embodiment of the supply system according to the present invention.

Referring to the drawings, in the exemplary embodiment, the present invention is used for a supply system, which supplies at least one medical device with different supply media. Examples of such supply media are different gases, e.g., breathing air, oxygen, different anesthetics, different fluids such as water or cleaning fluids, lubricants as well as an electrical socket and a port, e.g., a USB port, at a data network. The supply system is mounted in a stationary manner, for example, in a pivotable manner, at a ceiling. A medical device can be connected detachably to the stationary supply system. Various medical devices, also different medical devices, can preferably be connected one after the other to the same supply system.

Figure 2:
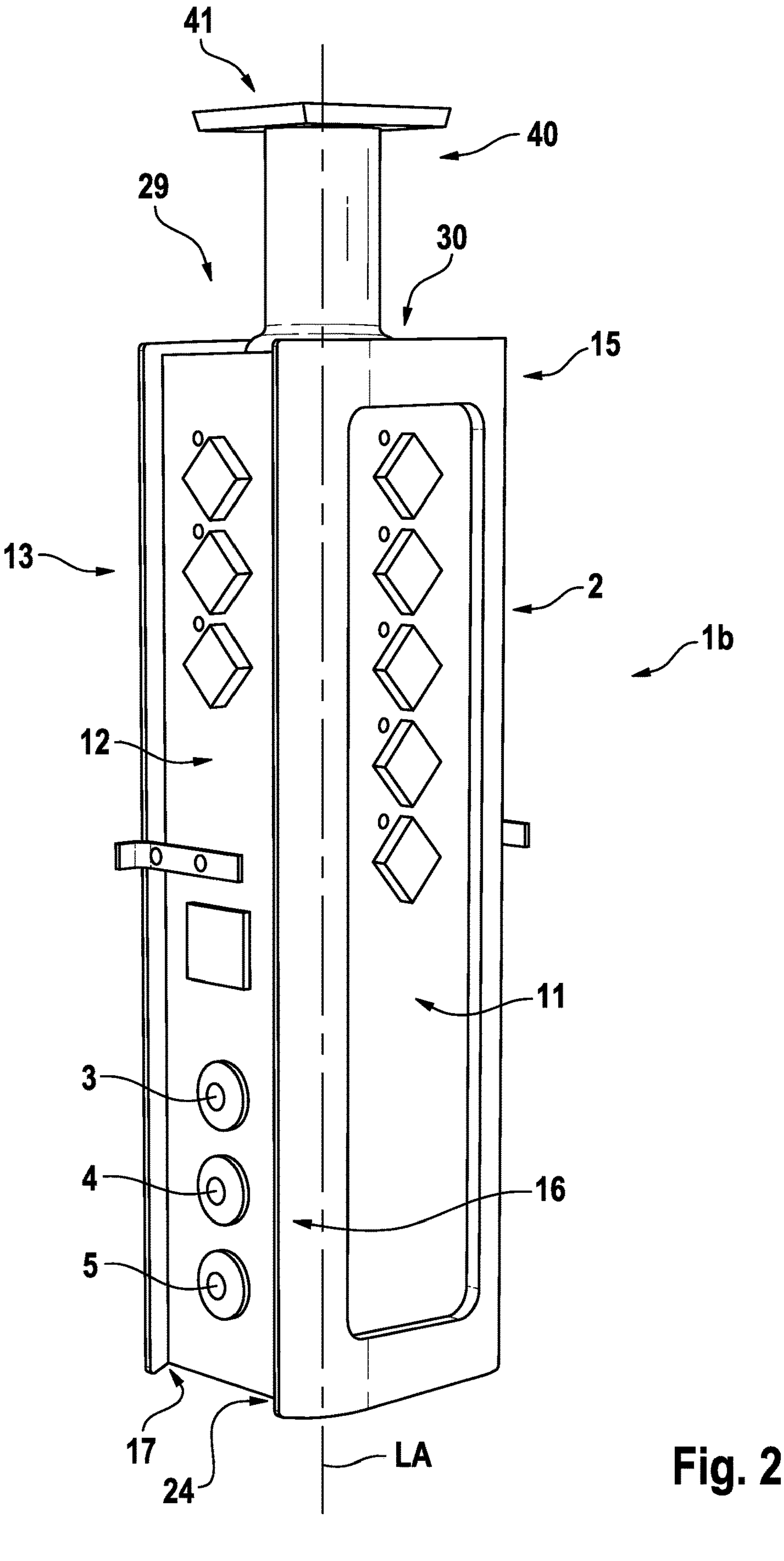
FIG. 2 is a perspective view showing a second embodiment of the supply system according to the present invention.
Figure 3:
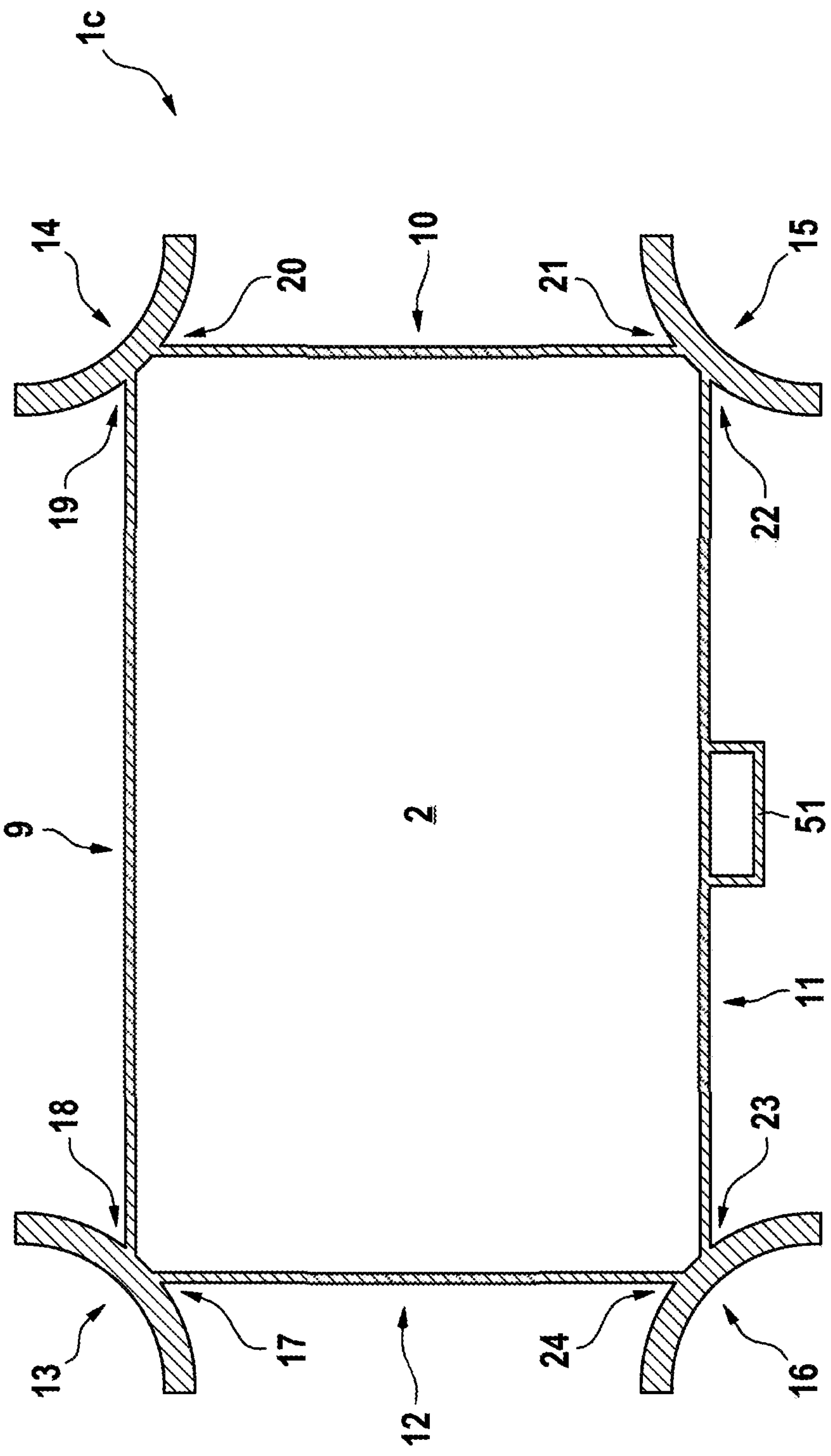
FIG. 3 is a sectional view showing a third embodiment of a supply system according to the present invention.

FIG. 1 shows a first embodiment 1$a$ of a supply system according to the present invention, FIG. 2 shows a second embodiment 1$b$, and FIG. 3 shows a third embodiment 1$c$. FIG. 1 and FIG. 3 show in a sectional view the supply system 1$a$ and 1$c$, respectively, in a horizontal plane, FIG. 2 shows the supply system 1$b$ in a perspective view in a viewing direction from the side.

The supply system 1$a$ of the first embodiment provides for different supply media six supply ports 3 through 8, which are arranged in the same horizontal plane, and optionally additional supply ports, not shown. The supply system 1$b$ provides three different ports 3 through 5, and the supply system 1$c$ likewise provides a plurality of supply ports, which are not shown.

In all three embodiments, the supply system 1$a$, 1$b$, 1$c$ comprises a basic body 2. This basic body 2 has the form of a column with a rectangular base and extends along a vertical longitudinal axis LA during the operation. The column is mounted at the ceiling and/or on the floor and can preferably be moved in relation to the ceiling or in relation to the floor. The longitudinal axis LA of this column is at right angles to the drawing planes of FIG. 1 and FIG. 3 and lies in the drawing plane of FIG. 2. The basic body 2 is preferably mounted such that it is accessible from all sides.

The supply ports 3 through 8 are fastened in recesses provided in the basic body 2. The basic body 2 encloses an interior from all sides. The terms “on the inside” and “on the outside” used below refer to this interior. A plurality of parallel supply lines, which carry and/or suction each a supply medium to a supply port in the basic body 2 or establish a current connection or a data connection with a connected medical device, are guided in the interior of the basic body 2.

The basic body 2 comprises four vertical outer wall sections 9, 10, 11, 12, which are mechanically connected to one another and provide the column with the rectangular base. Each outer wall section 9, 10, 11, 12 extends in a respective vertical plane and the planes of two adjacent outer wall sections adjoin one another in a right angle. FIG. 1 shows the four surface normals V9 through V12 of the outer wall sections 9 through 12, wherein each surface normal V9 through V12 is at right angles to a planar outer wall section 9 through 12. In the perspective view of FIG. 2, only the two outer wall sections 11 and 12 are visible, and the other two outer wall sections 9 and 10 are hidden. Of course, a different number of outer wall sections and/or a different angle between two adjacent outer wall sections is also possible.

Two respective adjacent outer wall sections 9 through 12 are mechanically connected to one another by a connection section 13, 14, 15, 16, for example, the two adjacent outer wall sections 9 and 12 are mechanically connected to one another by the connection section 13. The four vertical outer wall sections 9 through 12 and the four connection sections 13 through 16 together form a lateral surface of the column-shaped basic body 2. This lateral surface has an outwardly pointing surface, which is preferably made of a material, which can be easily cleaned and disinfected and as a result meets the requirements of a medical facility.

The two end faces of the column are formed by a basic body top and by a basic body bottom. In the exemplary embodiment, the basic body top and the basic body bottom extend in two parallel horizontal planes, which are parallel to the drawing planes of FIG. 1 and FIG. 3 and are approximately at right angles to the drawing plane of FIG. 2. The basic body top is mechanically connected to all four outer wall sections 9 through 12 as well as to all four connection sections 13 through 16. The same applies to the basic body bottom.

FIG. 2 shows a basic body top 30 of the basic body 2. This basic body top 30 can be fastened by means of a mounting arm 40 to a ceiling or to an extension arm. The mounting arm 40 comprises a cylindrical spacer element 29, which in one embodiment is configured as telescopic or in a different manner as variable in length, as well as a mounting element 41, which can be fastened to a ceiling or an extension arm. Because the basic body 2 is fastened to the ceiling or close to the ceiling, the area below the basic body 2 remains free, so that a person and/or a medical device may be located there. If the length of the spacer element 29 can be changed, it is possible to bring the basic body 2 into a desired height above the room floor.

Each connection section 13 through 16 has two respective undercuts 17 through 24, which are arranged at a spaced location from one another and preferably point in two different directions, especially preferably in two opposite directions. Thus, the basic body 2 has a total of 2*4=8 undercuts 17 through 24. Each undercut 17 through 24 has the form of a channel or a flute or a groove or a sectional rail, which extends parallel to the longitudinal axis LA of the basic body 2, namely preferably along the entire basic body 2 from the basic body top 30 to the basic body bottom. For example, the connection section 13 has the two undercuts 17 and 18 and the connection section 16 has the two undercuts 23 and 24, etc. The undercut 17 adjoins the outer wall section 12, the undercut 18 adjoins the outer wall section 9, etc. Each undercut 17 through 24 preferably covers an angle, which is between 20° and 70°, especially preferably between 30° and 60°.

In the exemplary embodiment, each connection section 13 through 16 and therefore also the two undercuts of this connection section 13 through 16 are mirror symmetrical to one another in relation to a vertical symmetry plane S13 through S16. The connection section 13 is mirror symmetrical to the symmetry plane S13, etc. The two undercuts 17 through 24 of a connection section 13 through 16 have therefore the same distance from the symmetry plane of this connection section 13 through 16. The vertical symmetry plane S13 through S16 of a connection section 13 through 16 preferably cuts in half the angle between the two outer wall sections 9 through 12, which are connected to one another by this connection section 13 through 16.

The connection sections 13 through 16 of the first embodiment according to FIG. 1 have the shape of mushrooms thanks to the undercuts 17 through 24. Each undercut 17 through 24 has the shape of an embedded rounding and extends in the form of a flute, which extends parallel to the longitudinal axis LA of the basic body 2, i.e., is at right angles to the drawing plane of FIG. 1. Each undercut 17 through 24 of the first embodiment has the shape of a circular segment, which covers an angle, which is preferably between 100° and 170°, especially preferably between 120° and 150°. It is also possible that this circular segment covers an angle of greater than 170° or even greater than 180°.

In the first embodiment according to FIG. 1, each connection section 13 through 16 comprises a respective reinforcing structure 25 through 28, which points towards the interior in the basic body 2 and belongs to the outer wall sections 9 through 12 and to the connection sections 13 through 16 and increases the wall thicknesses thereof in the area of the undercuts 17 through 24. Because the reinforcing structure 25 through 28 points towards the interior and is not arranged on the surface pointing outwards, this reinforcing structure 25 through 28 does not lead to unevennesses on the outer surface of the basic body 2. Such an unevenness is undesired, especially because dirt can collect there and because cleaning is made difficult.

Thanks to this optional reinforcing structure 25 through 28, the basic body 2 has in the area of a connection section 13 through 16 an increased mechanical strength, especially an increased stiffness and/or an increased buckling strength, compared with outer wall sections 9 through 12, which are also planar on the inside, and compared with a configuration without reinforcing structure. The reinforcing structure 25 through 28 of a connection section 13 through 16 is preferably also mirror symmetrical to the symmetry plane S13 through S16 of this connection section 13 through 16. In the exemplary embodiment being shown, the basic body 2 comprises for each connection section 13 through 16 a respective reinforcing structure 25 through 28 on both sides of the connection section 13 through 16.

In the third embodiment according to FIG. 3, each connection section 13 through 16 has the shape of a quarter-circular segment or quarter-elliptical segment. Each connection section thus has the shape of a segment of a circle or of an ellipse, wherein the segment preferably covers an angle of 70° to 110°, especially preferably 90°. Each connection section 13 though 16 is curved outwards, thus away from the basic body 2. The two undercuts 17 through 24 of a connection section 13 through 16 are present between the quarter-circular segment and the two outer wall sections 9 through 12, which adjoin one another and are connected to one another. Such a connection section 13 through 16 can in many cases be produced more easily than a connection section of a different shape and has a higher mechanical stability.

At least one component 50 can be fastened to the basic body 2. Examples of such a component 50 are a tray for medical instruments, a mounting arm for an additional device, a light, an operating unit or a display unit. It is possible to fasten a plurality of different components, also components of different sizes and/or of different shapes, one after the other to the same basic body 2. It is also possible to mount on a basic body 2 a plurality of components 50 above one another and/or next to one another at different positions. The basic body 2 prevents, on the one hand, the fastened component 50 from falling or slipping downwards. The basic body 2 prevents the fastened component 50 from moving obliquely or horizontally to the side, on the other hand.

Thanks to the undercuts 17 through 24 and the reinforcing structure 25 through 28 at the corners of the basic body 24, it is selectively possible to mount a component 50 in front of an outer wall section 9 through 12 or in front of a corner, i.e., in front of a connection section 13 through 16. A large component 50 can also be mounted such that it covers both an outer wall section 9 through 12 and a connection section 13 through 16 in the horizontal direction. As a result, the supply system 1*a*, 1*b*, 1*c* provides more possible mounting places for at least one component 50 than the prior-art supply systems.

At least one holding element 51 is fastened to the basic body in one embodiment in order to prevent the fastened component 50 from falling or slipping downwards. The component 50 is supported by this holding element 51, for example, from below. Or a hook or another fastening element of the component 50 engages (meshes) with a corresponding opening of the holding element 51.

At least one undercut, preferably two undercuts 17 through 24 of two different adjacent connection sections 13 through 16, or the two undercuts 17 through 24 of the same connection section 13 through 16, act in an embodiment as a respective guide rail each for the fastened component 50. Thanks to these guide rails, it is sufficient that the holding element 51 is in contact with the component 50 in a single point. Nevertheless, the component 50 is held securely in a position predefined by the construction of the basic body 2. It is possible that a plurality of holding elements 51 at right angles or obliquely above one another are fastened to the basic body 2, so that a plurality of components 50 can be detachably fastened above one another to the basic body 2. The undercuts 17 through 24 act as guide rails for these components 50 fastened above one another. It is also possible to fasten a component 50 selectively in a first position or in a second position to the basic body 2, wherein the first position is located above the second position. Moreover, it is possible to move the component 50 along the longitudinal axis LA. An embodiment without a holding element 51 is also possible.

The component 50 has on the side pointing towards the basic body 2 at least one engaging element, which engages with an undercut 17 through 24 from outside, for example, a bracket. It is possible that a plurality of engaging elements, which are arranged above one another on the inside at the component 50, engage with the same undercut 17 through 24. The component 50 preferably has a plurality of engaging elements, which are arranged next to one another and engage with at least two different undercuts 17 through 24. These engaging elements prevent the component 50 from slipping downwards. In addition, it is possible that the component 50 is wedged, as desired, into the undercuts 17 through 24 and also is held as a result.

The embodiments with the engaging element at the component 50 and with the holding element 51 at the basic body 2 can be combined with one another.

Figure 4:
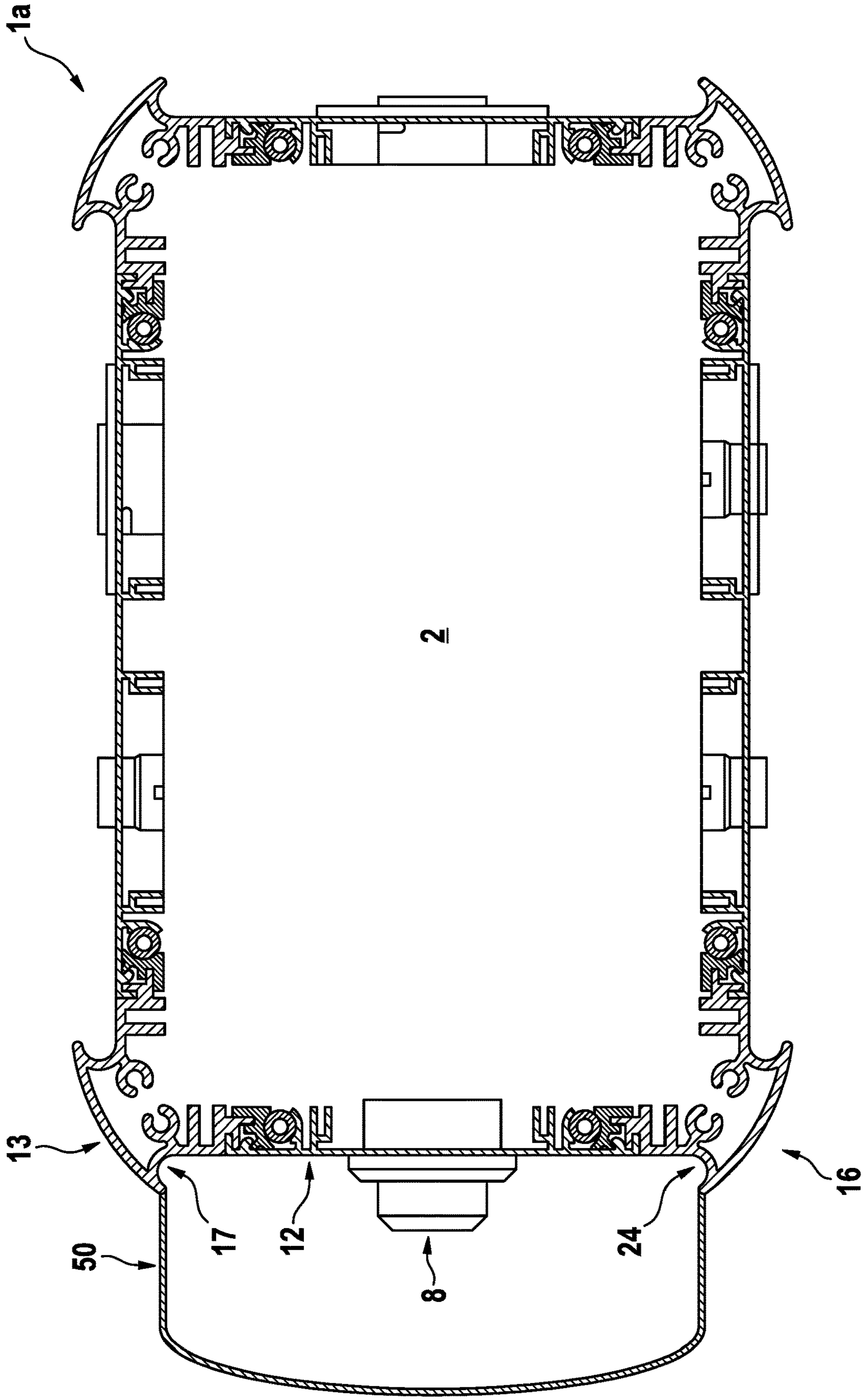
FIG. 4 is a sectional view showing a component fastened detachably in front of an outer wall section and between two connection sections.
Figure 5:
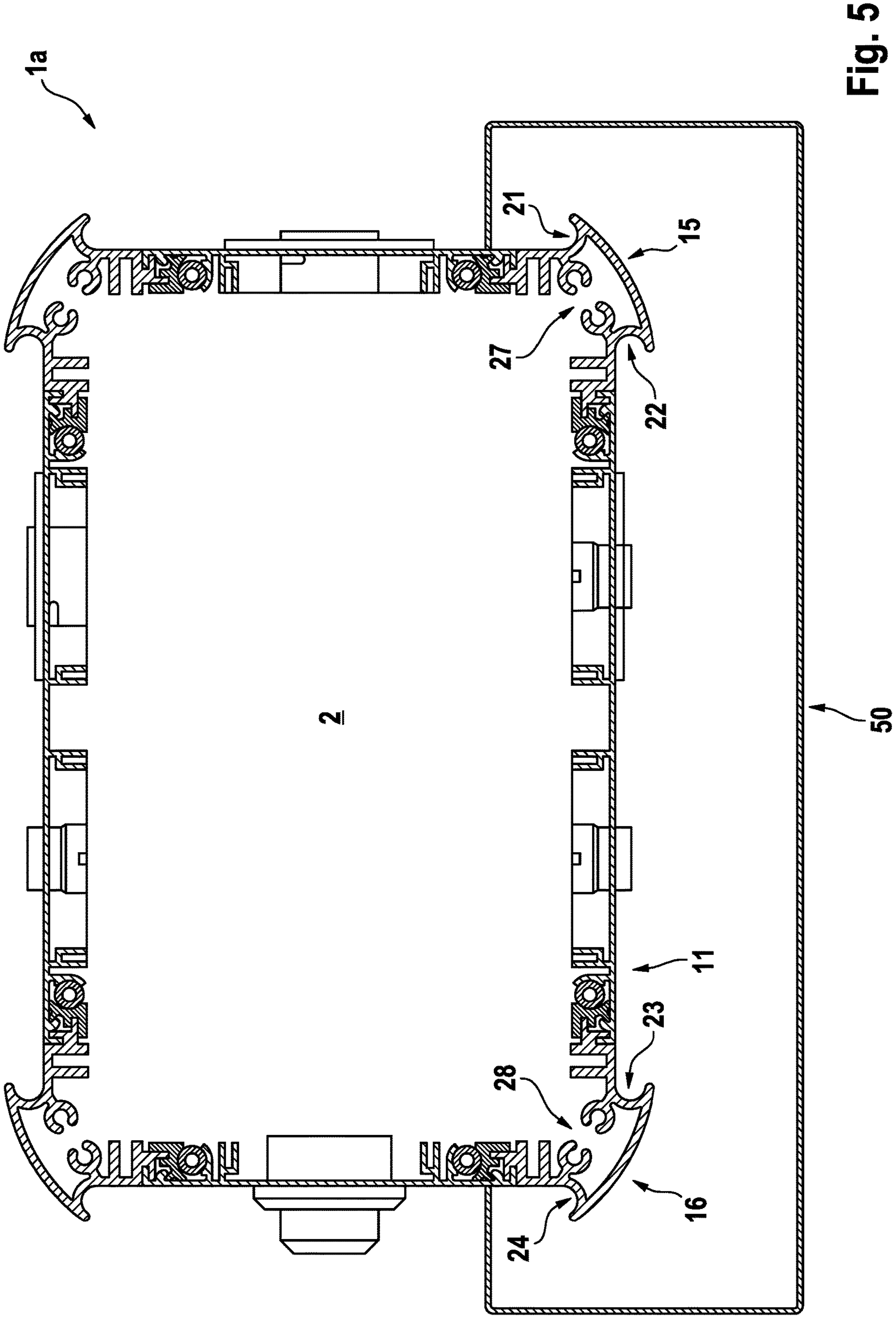
FIG. 5 is a sectional view showing a component fastened detachably in front of an outer wall section and covering both adjoining connection sections.
Figure 6:
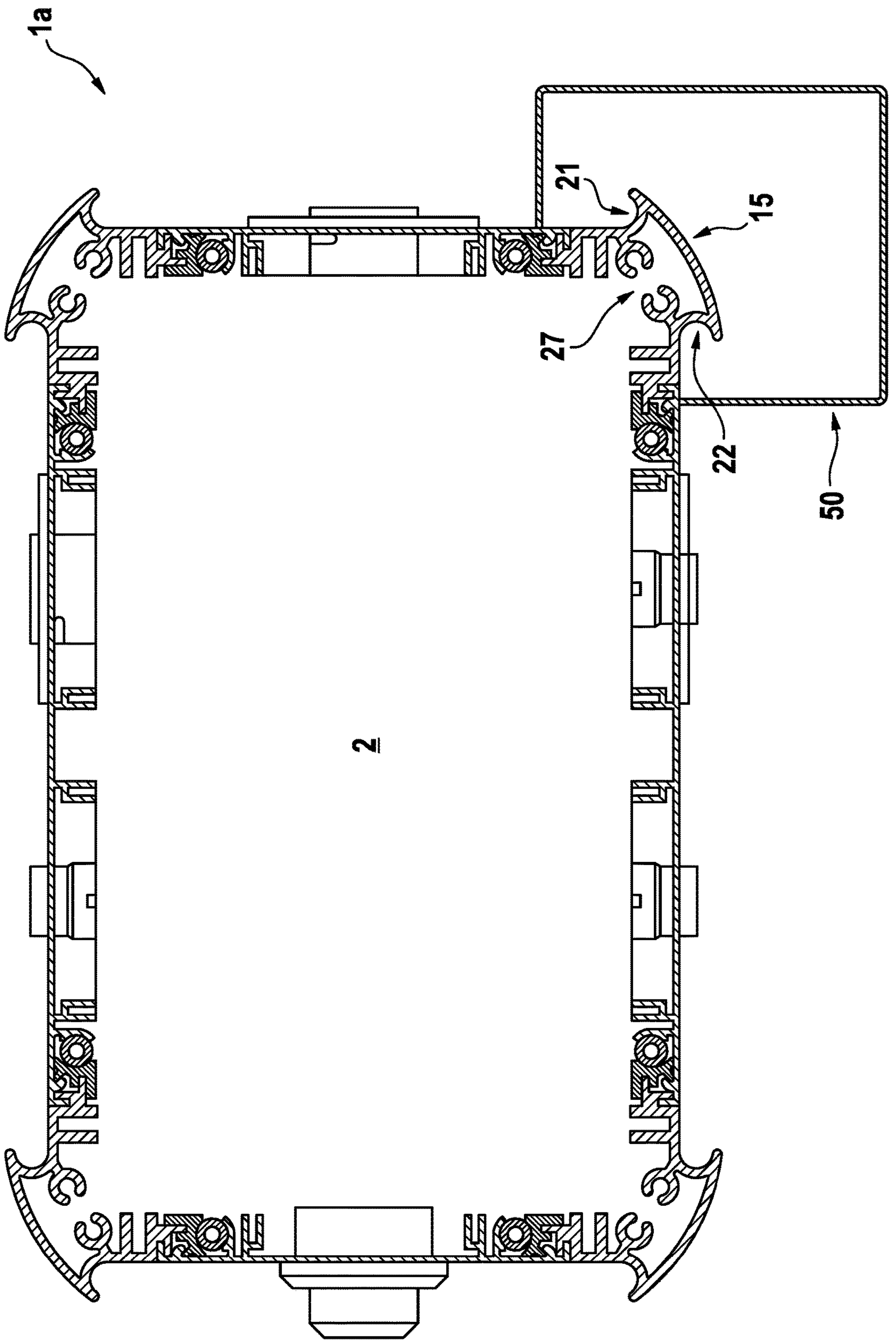
FIG. 6 is a sectional view showing a component fastened detachably to a connection section and extending around same.

FIG. 4 through FIG. 6 schematically show the respective outer contour of a component 50. The longitudinal axis LA of the basic body 2 is at right angles to the drawing planes of FIG. 4 through FIG. 6. This component 50 is detachably fastened to the basic body 2 of the first embodiment. In addition, the component 50 is optionally held by the holding element 51, which is not shown in FIG. 4 through FIG. 6.

In the example of FIG. 4, an engaging element of the component 50 and/or the inner contour of the component 50, which inner contour points towards the basic body 2, engages with the two undercuts 17 and 24, and the component 50 is located between the two guide rails 17 and 24. The component 50, for example, a tray, is located below the supply port 8.

In the example of FIG. 5, the inner contour of the component 50 engages into the two undercuts 21 and 24 and optionally additionally into the two adjacent undercuts 23 and 22. The component 50 is thus held and optionally guided by at least two vertical undercuts 21 and 24 and optionally additionally by two additional vertical undercuts 22 and 23. The component 50 fully encloses the two connection sections 15 and 16.

In the example of FIG. 6, the component 50 is held and guided by the two undercuts 21 and 22 of the connection section 15, i.e., by two undercuts of the same connection section. The component 50 fully encloses the connection section 15. Especially thanks to the reinforcing structure 27 at the connection section 15, the basic body 2 also has a sufficient strength in this corner 15.

While specific embodiments of the invention have been shown and described in detail to illustrate the application of the principles of the invention, it will be understood that the invention may be embodied otherwise without departing from such principles.

LIST OF REFERENCE CHARACTERS

- 1*a* Supply system according to the present invention according to the first embodiment; it comprises a basic body 2
- 1*b* Supply system according to the present invention according to the second embodiment; it comprises a basic body 2
- 1*c* Supply system according to the present invention according to the third embodiment; it comprises a basic body 2
- 2 Basic body; it comprises the outer wall sections 9 through 12, the connection sections 13 through 16, the basic body top cover 30 and a basic body bottom
- 3 through 8 Supply port, flush-mounted in a recess in an outer wall section 9 through 12 of the basic body 2
- 9 through 12 Vertical outer wall section; it belongs to the basic body 2; it has the surface normal V9 through V12
- 13 through 16 Connection section; it connects two adjacent outer wall sections 9 through 12 to one another; it belongs to the basic body 2; it has two undercuts 17 through 24
- 17 through 24 Undercuts of a connection section 13 through 16; they extend parallel to the longitudinal axis LA; they are capable of holding a component 50 detachably at the basic body 2

25 through 28 Reinforcing structure of a connection section 13 through 16; it is arranged in the interior of the basic body 2

29 Cylindrical spacer element; it belongs to the mounting arm 40; it is connected mechanically to the basic body bottom 30 and to the mounting element 41

30 Basic body bottom; it is connected mechanically to all outer wall sections 9 through 12 and to all connection sections 13 through 16

40 Mounting arm; it comprises the cylindrical spacer element 29

41 Mounting element; it can be fastened to a ceiling; it is connected mechanically to the spacer element 29

50 Component, which can be detachably fastened to the basic body 2; it engages with two undercuts 17 through 24

51 Optional holding element at the basic body 2; it is capable of detachably holding a component 50

LA Longitudinal axis of the basic body 2

S13 through S16 Symmetry plane of the connection section 13 through 16; it extends parallel to the longitudinal axis LA V9 through V12 Surface normal; it is at right angles to a planar outer wall section 9 through 12 and at right angles to the longitudinal axis LA

The invention claimed is:

1. An arrangement comprising:

a supply system, the supply system comprising:

a basic body extending along a longitudinal axis, the basic body comprising:

a plurality of outer wall sections; and a first connection section and a second connection section mechanically connecting two of the outer wall sections to each other, the two connected of the outer wall sections being adjacent to one another, each of one of the first connection section and the second connection section comprising two undercuts, each of the undercuts having a channel form or a flute form or a groove form or a sectional rail form, each of the undercuts extending parallel to the longitudinal axis; and at least one supply port flush-mounted in the basic body and configured to provide a supply medium;

wherein the basic body extends along a longitudinal axis, the arrangement further comprising:

a component detachably connected or connectable to the basic body, wherein the component comprises two engaging elements, one of the engaging elements having a contour configured to engage into at least one of the two undercuts of the first connection section and another one of the engaging elements having a contour configured to engage into at least one of the two undercuts of the second connection section.

2. The arrangement in accordance with claim 1, wherein the at least one connection section with the two undercuts has a cross section, in a plane orthogonal to the longitudinal axis of the basic body, the cross section having a shape of a mushroom or of a T or of a C or of a circular segment or of an elliptical segment.

3. The arrangement in accordance with claim 1, wherein each of the undercuts has a C-shaped or circular segment-shaped or elliptical segment-shaped cross section, in a plane orthogonal to the longitudinal axis of the basic body, each of the undercuts being bent away from the two adjacent outer wall sections.

4. The arrangement in accordance with claim 1, wherein the at least one connection section is mirror symmetrical in relation to a symmetry plane, wherein the symmetry plane extends parallel to the longitudinal axis of the basic body, and wherein the symmetry plane cuts in half an angle between the two outer wall sections, the two outer wall sections being adjacent to the connection section.

5. The arrangement in accordance with claim 1, wherein the plurality of outer wall sections comprises a plurality of outer wall sections;

wherein the at least one connection section is one of a plurality of connection sections including at least an additional connection section;

wherein the basic body is columnar with the plurality of outer wall sections and the number of connection sections, each of the plurality of connection sections connecting two outer wall sections, wherein the at least an additional connection section has an additional connection section undercut, the additional connection section undercut having a form of a channel or a flute or a groove or a sectional rail and extends parallel to the longitudinal axis of the basic body.

6. The arrangement in accordance with claim 1, wherein the basic body has at least one reinforcing structure, wherein the at least one reinforcing structure increases a wall thickness of one of the outer wall sections connected to the at least one reinforcing structure in an area, the area adjoining the at least one connection section.

7. The arrangement in accordance with claim 6, wherein the basic body further comprises an additional connection section that mechanically connects two respective outer wall sections to each other, the two respective outer wall sections being adjacent to one another and the additional connection section having at least one undercut having a form of a channel or a flute or a groove or a sectional rail and extends parallel to the longitudinal axis of the basic body;

wherein the basic body has a reinforcing structure for the additional connection section that increases a wall thickness of one of the two respective outer wall sections connected to the additional connection section, in an area which adjoins the at least one connection section.

8. The arrangement in accordance with claim 1, wherein each of the engaging elements engages with one of the undercuts to form a detachable connection, the detachable connection holding the component detachably at the basic body.

9. An arrangement comprising:

a supply system comprising:

a basic body extending along a longitudinal axis, the basic body comprising:

a first outer wall section;

a second outer wall section, the first outer wall section being adjacent to the second outer wall section;

a third outer wall section, the third outer wall section being located adjacent to the first outer wall section; and a connection section mechanically connecting the first outer wall section and the second outer wall section, the connection section comprising a first undercut and a second undercut, each of the first undercut and the second undercut having a channel form or a flute form or a groove form or a sectional rail form, each of the first undercut and the second undercut extending parallel to the longitudinal axis;

another connection section mechanically connecting the first outer wall section and the third outer wall section, the another connection section comprising another undercut and yet another undercut, each of the another undercut and the yet another undercut having a channel form or a flute form or a groove form or a sectional rail form, each of the another undercut and the yet another undercut extending parallel to the longitudinal axis; and a supply port flush-mounted in the basic body and configured to provide a supply medium; and a component detachably connected or connectable to the basic body, wherein the component comprises a first engaging element and a second engaging element, the first engaging element being configured to engage into one of the first undercut and the second undercut, the second engaging element being configured to engage into one of the another undercut and the yet another undercut.

10. The arrangement in accordance with claim 9, wherein the first engaging element and the first undercut forming a first detachable connection, the second engaging element and the second undercut forming a second detachable connection, the first detachable connection and the second detachable connection holding the component detachably at the basic body.

11. The arrangement in accordance with claim 9, wherein the connection section comprises an arcuate surface extending from a position adjacent to the first undercut to a position adjacent to the second undercut, arcuate surface being free of recesses.

12. A supply system comprising:

a basic body; and at least one supply port, wherein the basic body extends along a longitudinal axis, wherein the at least one supply port is flush-mounted in the basic body and is configured to provide a supply medium, wherein the basic body comprises a plurality of outer wall sections and at least one connection section, wherein the at least one connection section mechanically connects two of the outer wall sections to each other, the two respective outer wall sections being adjacent to one another, and wherein the at least one connection section has two undercuts, each of the undercuts having a form of a channel or a flute or a groove or a sectional rail and each of the undercuts extending parallel to the longitudinal axis of the basic body, each of the undercuts being spaced apart from one another, each of the undercuts being configured to contact an inner contour of an engaging element of a component, one of the undercuts being located adjacent to one of the outer wall sections, another one of the undercuts being located adjacent to another one of the outer wall sections.

* * * * *